(12) United States Patent
Lai

(10) Patent No.: US 8,465,045 B2
(45) Date of Patent: Jun. 18, 2013

(54) BABY CARRIAGE

(76) Inventor: Chin-I Lai, Tainan (TW)

( * ) Notice: Subject to any disclaimer, the term of this patent is extended or adjusted under 35 U.S.C. 154(b) by 246 days.

(21) Appl. No.: 13/109,462

(22) Filed: May 17, 2011

(65) Prior Publication Data
US 2012/0292888 A1 Nov. 22, 2012

(51) Int. Cl.
*B62B 1/00* (2006.01)
*B62B 7/00* (2006.01)

(52) U.S. Cl.
USPC ........ 280/650; 280/647; 280/47.38; 280/657; 280/648

(58) Field of Classification Search
USPC ........... 280/647, 648, 655, 655.1, 658, 47.34, 280/47.371, 47.38, 642, 643, 657; 297/130, 297/118, 45, 250.1, 256.16
See application file for complete search history.

(56) References Cited

U.S. PATENT DOCUMENTS

| | | | | | |
|---|---|---|---|---|---|
| 4,191,397 | A | * | 3/1980 | Kassai | 280/647 |
| 4,272,100 | A | * | 6/1981 | Kassai | 280/650 |
| 5,625,923 | A | * | 5/1997 | Huang | 280/47.371 |
| 5,865,447 | A | * | 2/1999 | Huang | 280/648 |
| 6,386,575 | B1 | * | 5/2002 | Turner | 280/647 |
| 6,428,034 | B1 | * | 8/2002 | Bost | 280/658 |
| 7,017,936 | B2 | * | 3/2006 | Huang | 280/642 |
| 7,032,922 | B1 | * | 4/2006 | Lan | 280/648 |
| D583,718 | S | * | 12/2008 | Zweideck | D12/129 |
| 7,607,725 | B2 | * | 10/2009 | Dickie et al. | 297/45 |
| 7,938,435 | B2 | * | 5/2011 | Sousa et al. | 280/658 |
| 8,251,382 | B2 | * | 8/2012 | Chen et al. | 280/47.38 |
| 2002/0074774 | A1 | * | 6/2002 | Hsu et al. | 280/655.1 |

* cited by examiner

*Primary Examiner* — Jeffrey J Restifo
*Assistant Examiner* — James M Dolak
(74) *Attorney, Agent, or Firm* — Muncy, Geissler, Olds & Lowe, PLLC

(57) ABSTRACT

A baby carriage includes a frame and a seat mounted onto the frame. The frame includes a support rack and a pair of handle sets coupled on the support rack. The handle sets have respectively an elevation set and a folding set connected through a flexible member. The elevation set can adjust the height of a handgrip located at the upper end of the handle set. The folding set has an elastic pin and is inserted into the support rack. Through a driving member located on the upper end of the handle set, the latching state between elastic pin and the support rack can be released to rapidly fold and retract the frame. Usability is therefore improved and the folded size can also be reduced.

11 Claims, 17 Drawing Sheets

BABY CARRIAGE

FIELD OF THE INVENTION

The present invention relates to a baby carriage and particularly to a baby carriage equipped with an elevation set and a folding set to improve usability and facilitate unfolding and folding.

BACKGROUND OF THE INVENTION

With increasing of life quality these days, families with a baby or small child usually purchase at least one baby carriage to carry the baby or child going out. While the baby carriage is a useful carrying tool, it is often bulky and becomes an annoying burden during outing. Hence many techniques have been proposed in prior art to improve the shortcoming of inconvenient folding and provide additional functions to enhance usability.

Applicant has submitted U.S. application Ser. No. 12/709,066 entitled "stroller" that has a folding control set operable single-handed to control an elastic pin of a folding driver held in a handle bar to incorporate with a front tube to allow the handle bar to slide along the front tube, and a rear tube coupled with the handle bar through a linking rack to perform folding or unfolding against the front tube through a coupling holder hinged thereon and functioning as a gravity center.

While the aforesaid technique provides the convenience of single-handed operation to achieve faster folding, the handle bar is a curved tube, and hence the stroller can only be folded by pushing the front and rear parts towards the center without shrinking the volume thereof after folding. Moreover, the elements such as the folding driver are held in the handle bar and are linked with each other through a flexible element. To maintain linkage as desired, the length of the handle bar is limited by that of the flexible element and cannot be adjusted. Such a design results in a constant height held by a user and is not ergonomic, so there is still room for improvement.

SUMMARY OF THE INVENTION

The primary object of the present invention is to overcome the shortcomings of the conventional stroller that has a handle bar with unadjustable length and bulky volume resulting in difficulty of storage after folding by providing an improved baby carriage that includes a handle set containing an elevation set and a folding set. The elevation set is provided to allow adjustment of the length of a handle to meet user's comfortable requirement. The folding set allows the baby carriage to be shrunk into a smaller size after folding. The baby carriage of the invention provides many advantages of adjustable height as desired and simple folded.

To achieve the foregoing object, the baby carriage of the invention includes a frame and a seat mounted onto the frame. The frame includes a support rack and a pair of handle sets coupled on the support rack. Each handle set includes a handgrip, an elevation set, a folding set, a flexible member and an outer sleeve. The handgrip has a coupling portion with a coupling hole formed thereon and a driving member coupled on the outer side. The driving member has a driving portion pulled by a user. The elevation set includes a driven member, an adjustment member, a driven bar and a coupling member. The driven member has an upper latch slot. The adjustment member has an insertion portion at one end with a passage run through by the driven member. The insertion portion is inserted into the coupling hole of the handgrip. The adjustment member has an adjustment knob at one side with a pressing portion protruded outside the adjustment member and pressed by the user. The driven bar has a transverse hole at an upper end corresponding to the adjustment knob and a diagonal slot at a lower end. The coupling member has a hollow tube run through by the driven bar and a fastening hole at the lower end corresponding to the diagonal slot to hold a positioning plate which has a lug. The coupling member has a winding portion at a distal end. The folding set includes a lower driving member, an upper driving member, an elastic pin and an elastic member. The lower driving member and the upper driving member have respectively a first pin hole and a second pin hole inserted by the elastic pin. The lower driving member further has a lower latch slot at an upper end. The elastic member is interposed between the lower driving member and the upper driving member to force the lower and upper driving members to return to corresponding positions. The flexible member is a rope set with one end fastened to the upper latch slot of the driven member and wound around the winding portion for one coil and another end fastened to the lower latch slot of the lower driving member. The outer sleeve is coupled on the outer sides of the elevation set and the folding set, and has a plurality of adjustment holes formed on a lower wall thereof and latched by the lug of the positioning plate. As the flexible member is a rope set including an inner rope confined in an outer tube, when the user presses the adjustment knob to release the latched condition of the positioning plate, the position of the coupling member can be adjusted and the lug of the positioning plate is latched in a selected adjustment hole. Moreover, the coil size of the flexible member wound on the winding portion can be enlarged or shrunk due to different positions of the adjustment hole. However, since the two distal ends of the inner rope are respectively fastened to the upper and lower latch slots, the coil size of the outer tube of the flexible member does not affect the fastening relationship with the inner rope. After the driving portion of the driving member is pulled by the user, the elastic pin of the folding set can be driven to release the fastening condition with the support rack. Then the support rack can be folded to shrink the size of the baby carriage.

By means of the construction set forth above, the invention can provide many advantages, notably:

1. The elevation set can adjust the handle set to an optimal elevation to meet ergonomic requirement and alleviate user's pains in the loins and back caused by unsuitable height of the baby carriage.

2. As the flexible member is a rope set coupled with the elevation set and folding set, the elevation of the handle of the baby carriage can be adjusted and the volume thereof also can be shrunk after folding to improve usability.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
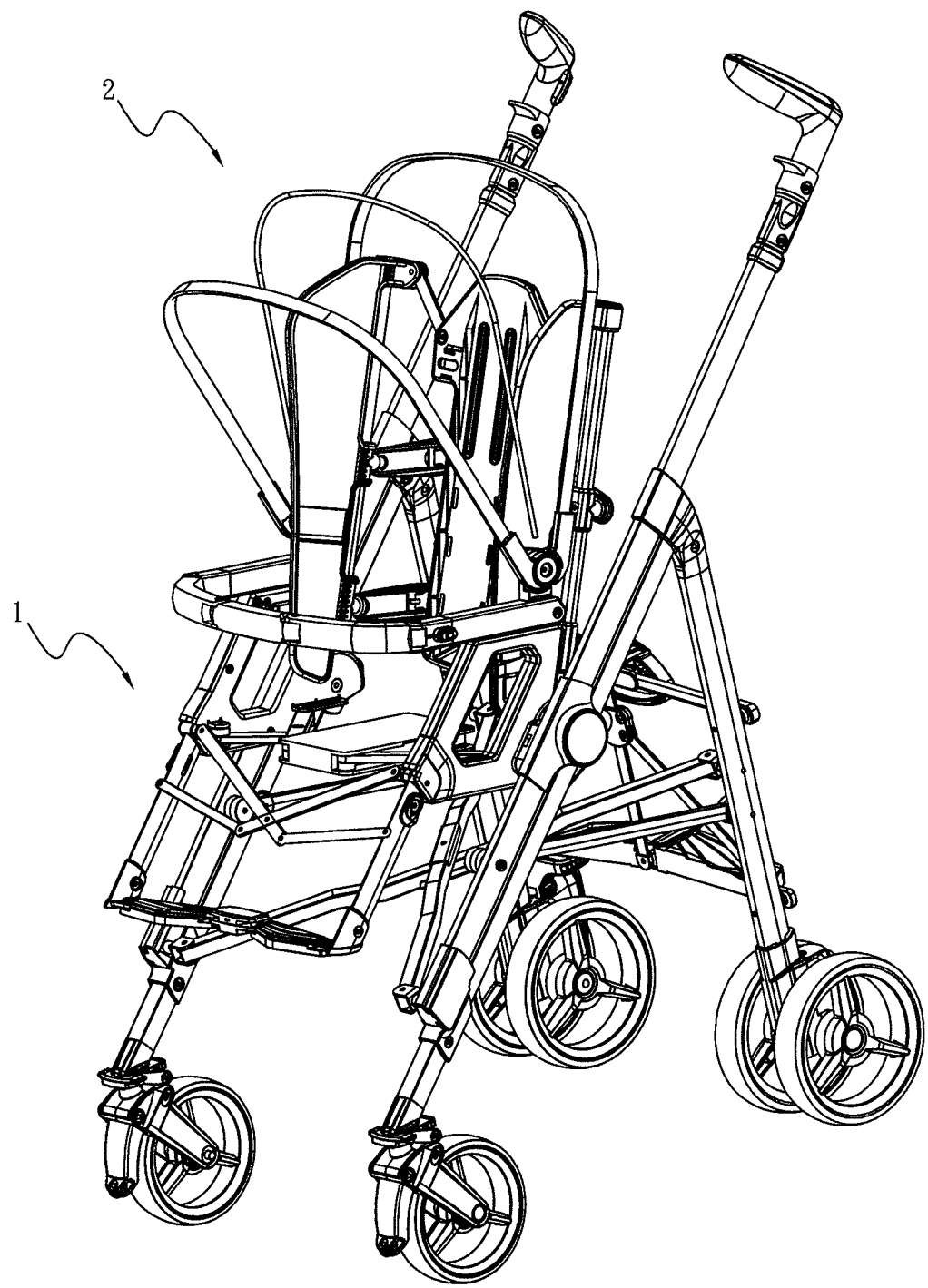
FIG. 1 is a perspective view of the invention.
Figure 2:
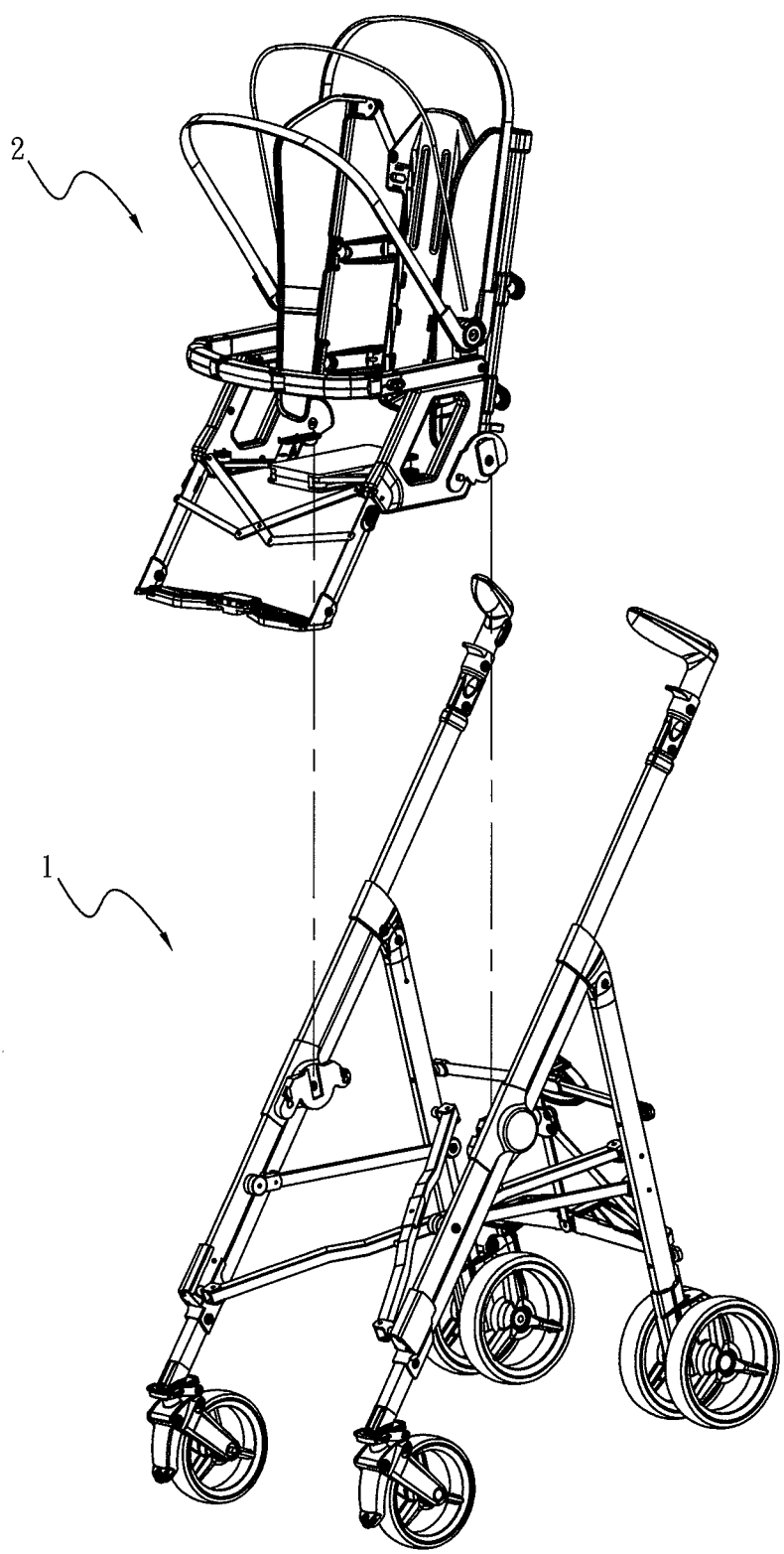
FIG. 2 is an exploded view of the invention.
Figure 3A:
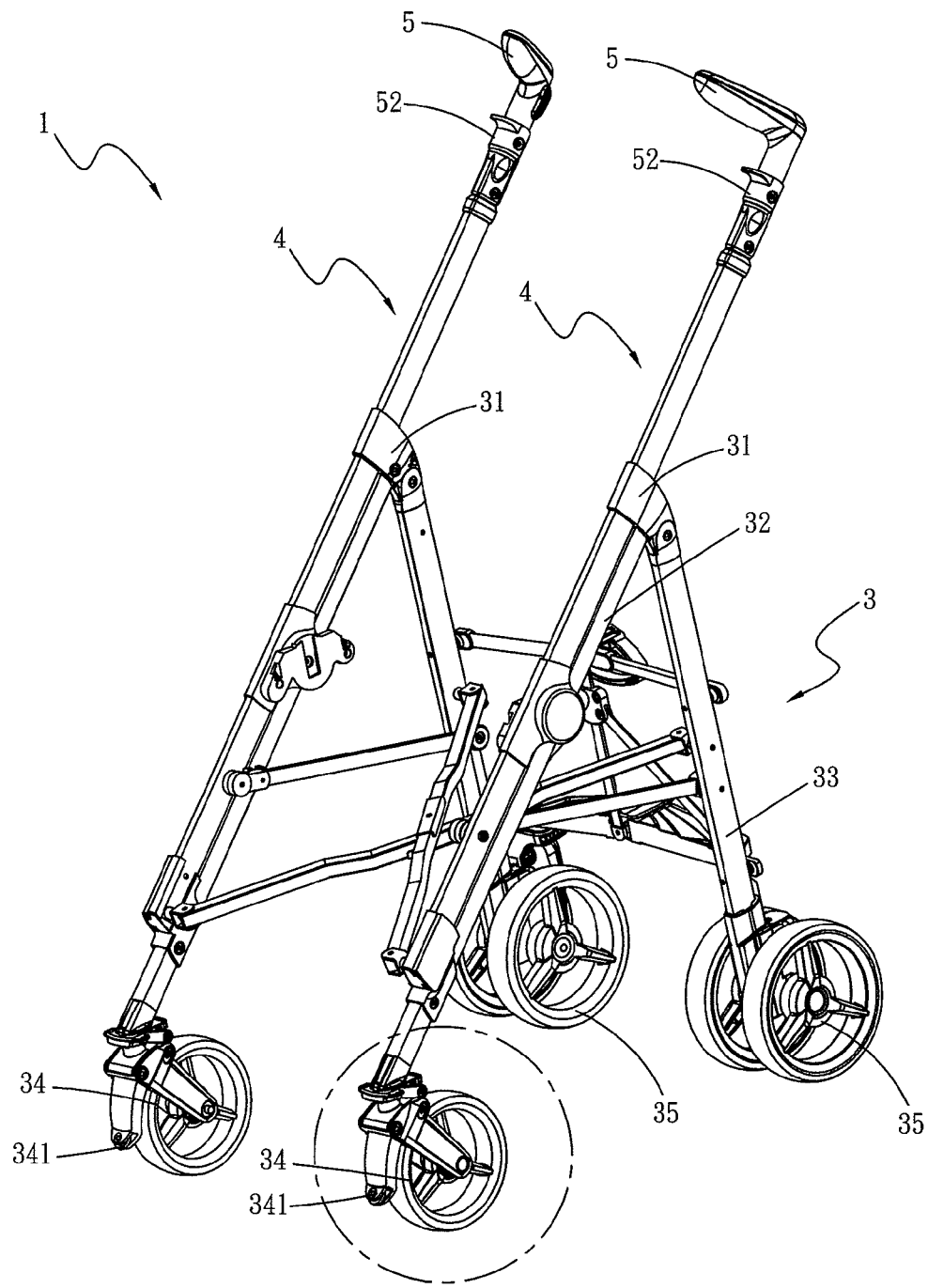
FIG. 3A is a perspective view of the frame of the invention.
Figure 3B:
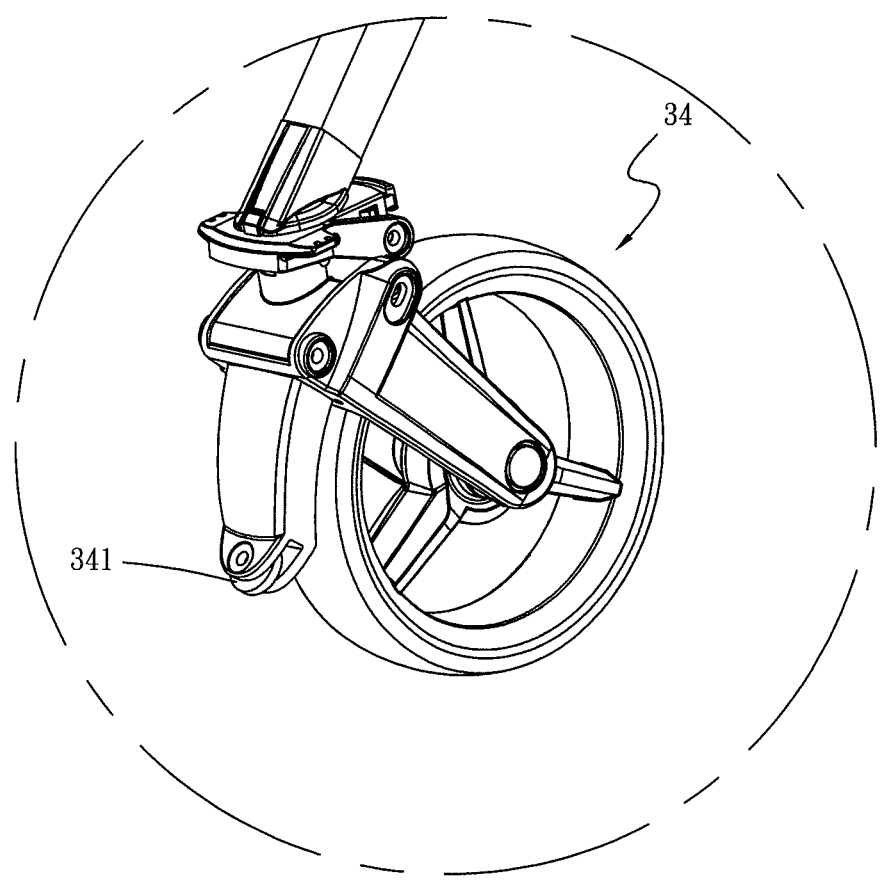
FIG. 3B is a fragmentary enlarged view of the front wheel set according to FIG. 3A.
Figure 4:
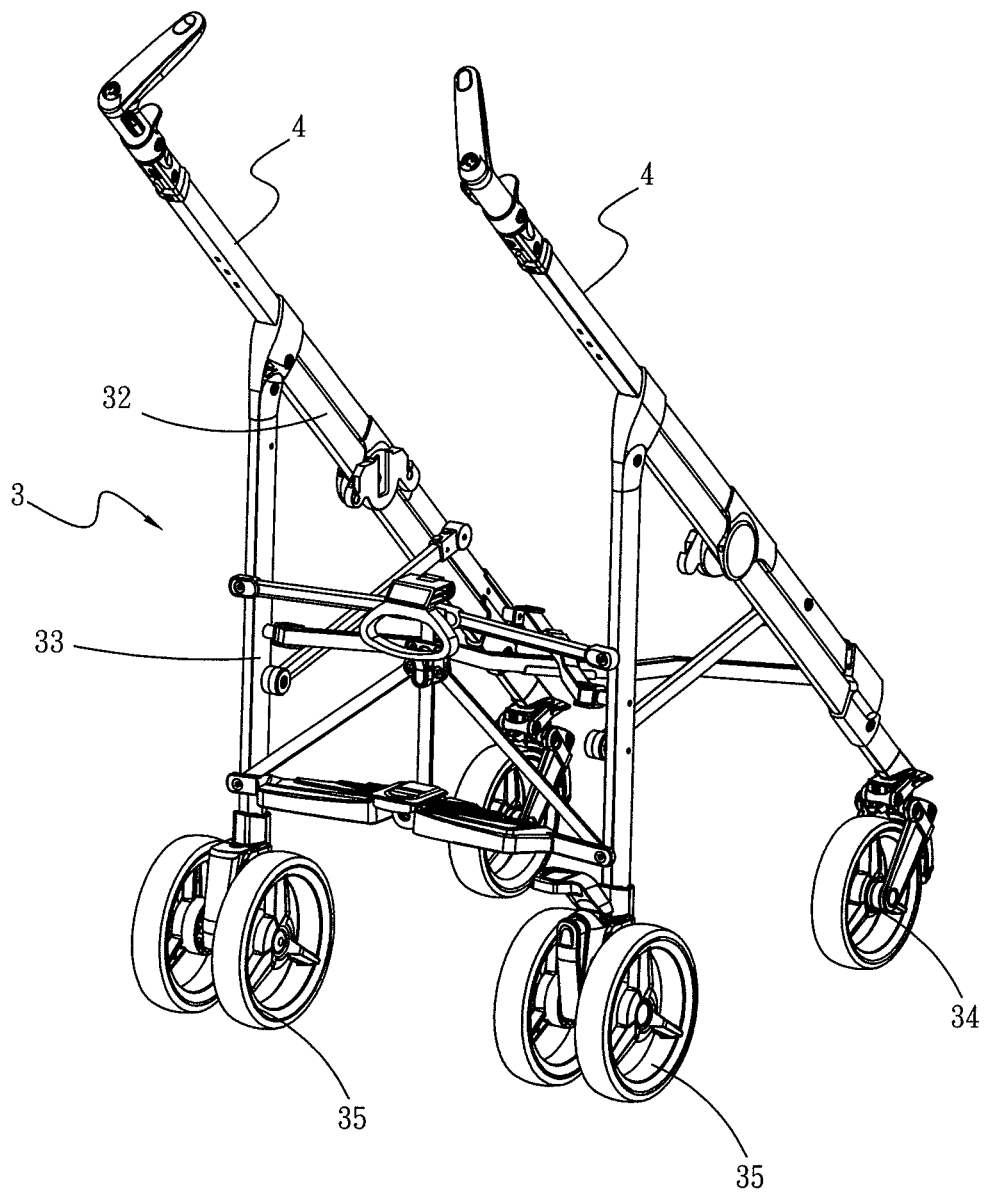
FIG. 4 is a rear perspective view of the frame of the invention.
Figure 5A:
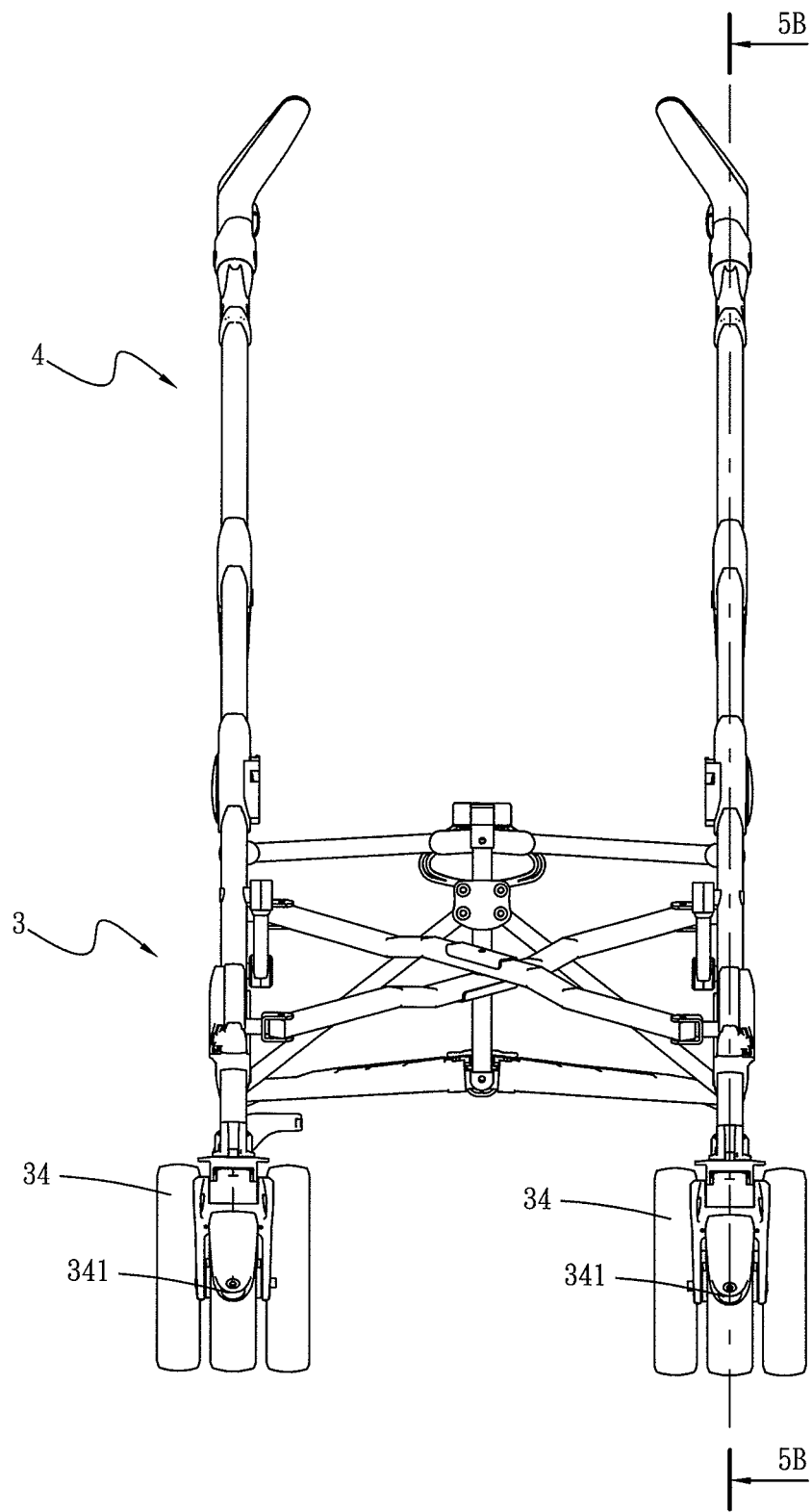
FIG. 5A is a front view of the frame of the invention.
Figure 5B:
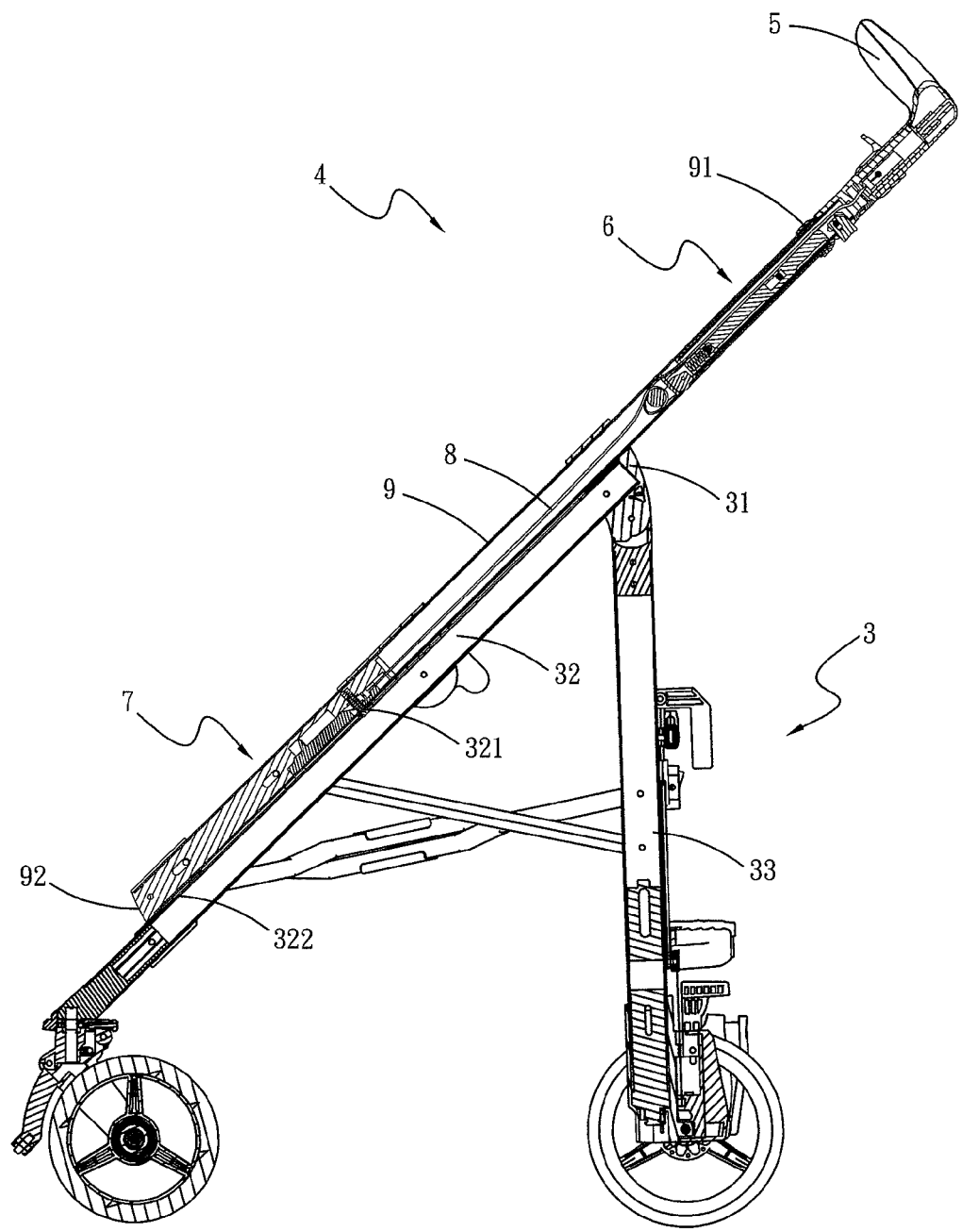
FIG. 5B is a sectional view taken on line 5B-5B in FIG. 5A.
Figure 6:
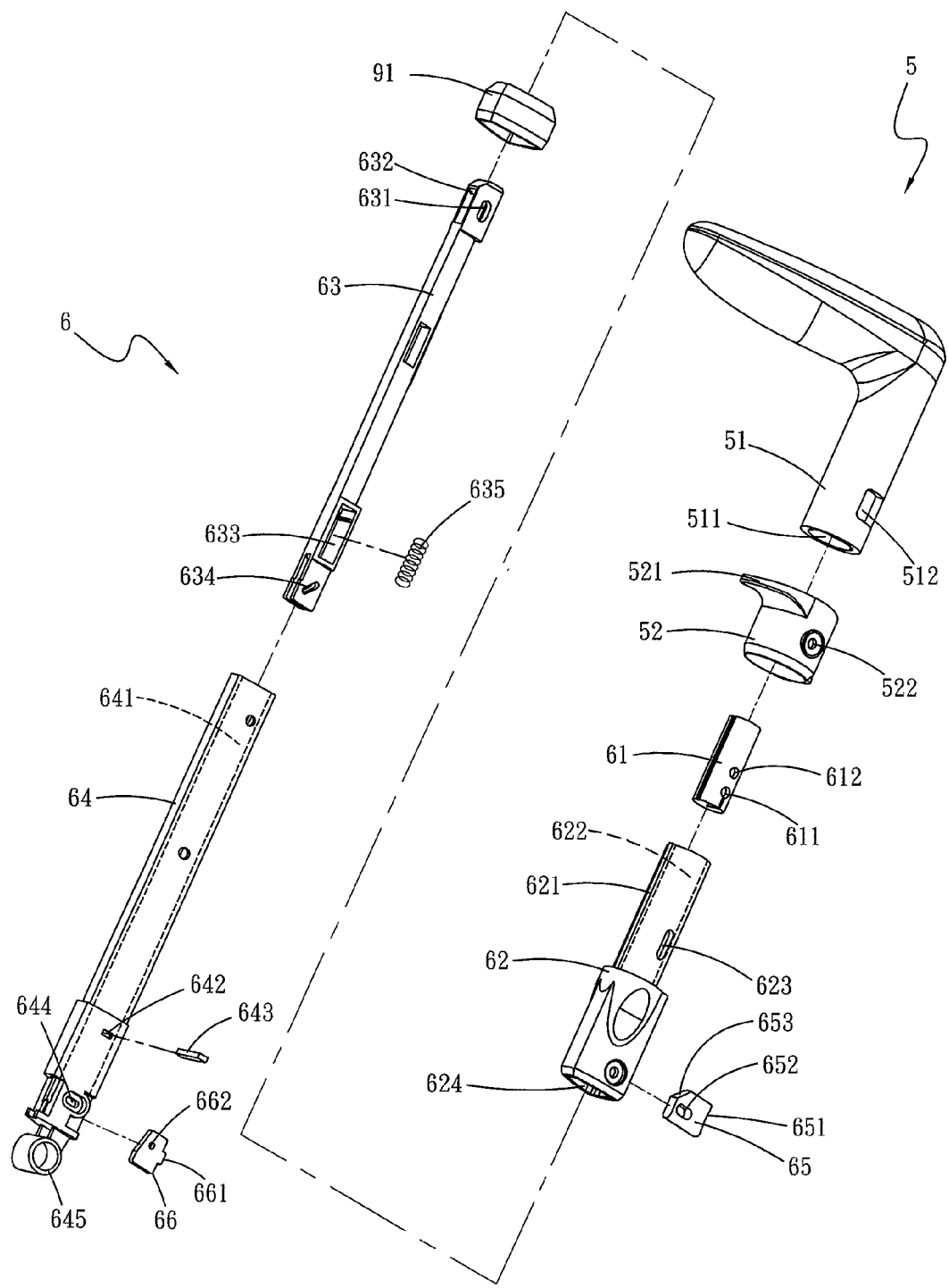
FIG. 6 is an exploded view of the handle set and elevation set of the invention.
Figure 7:
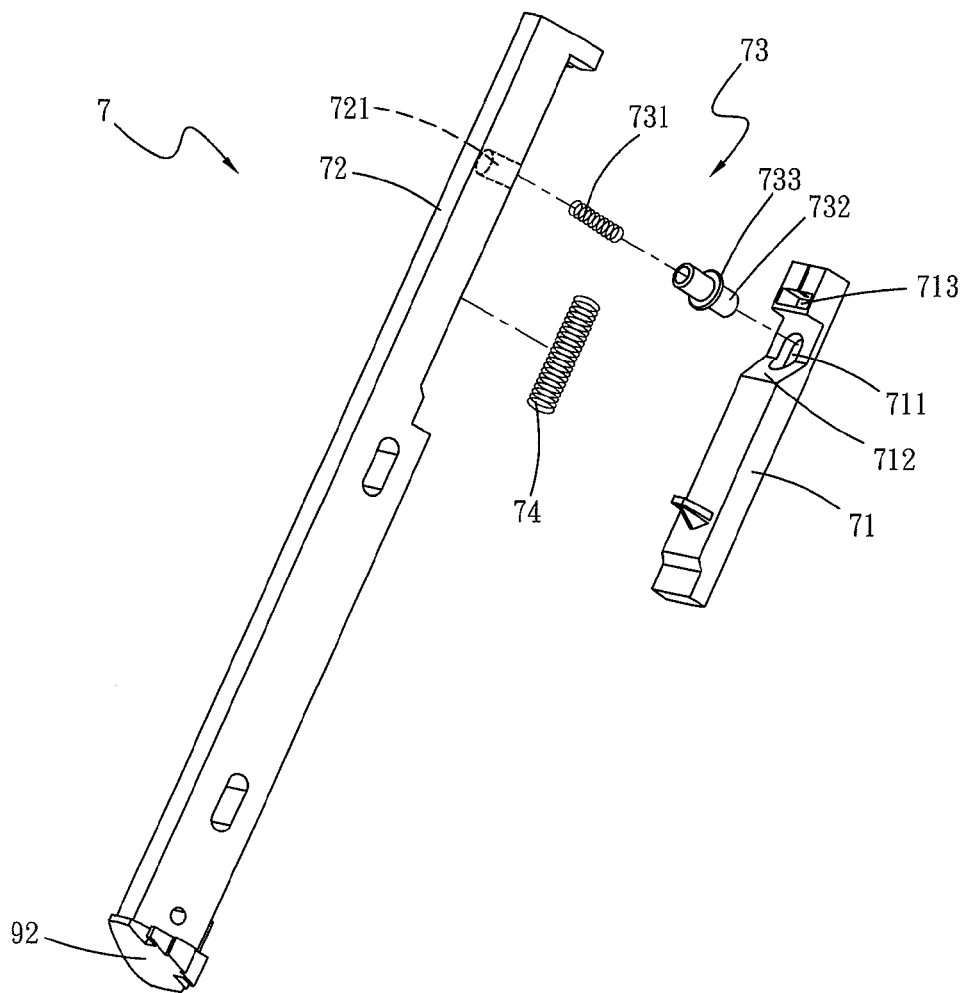
FIG. 7 is an exploded view of the folding set of the invention.
Figure 8A:
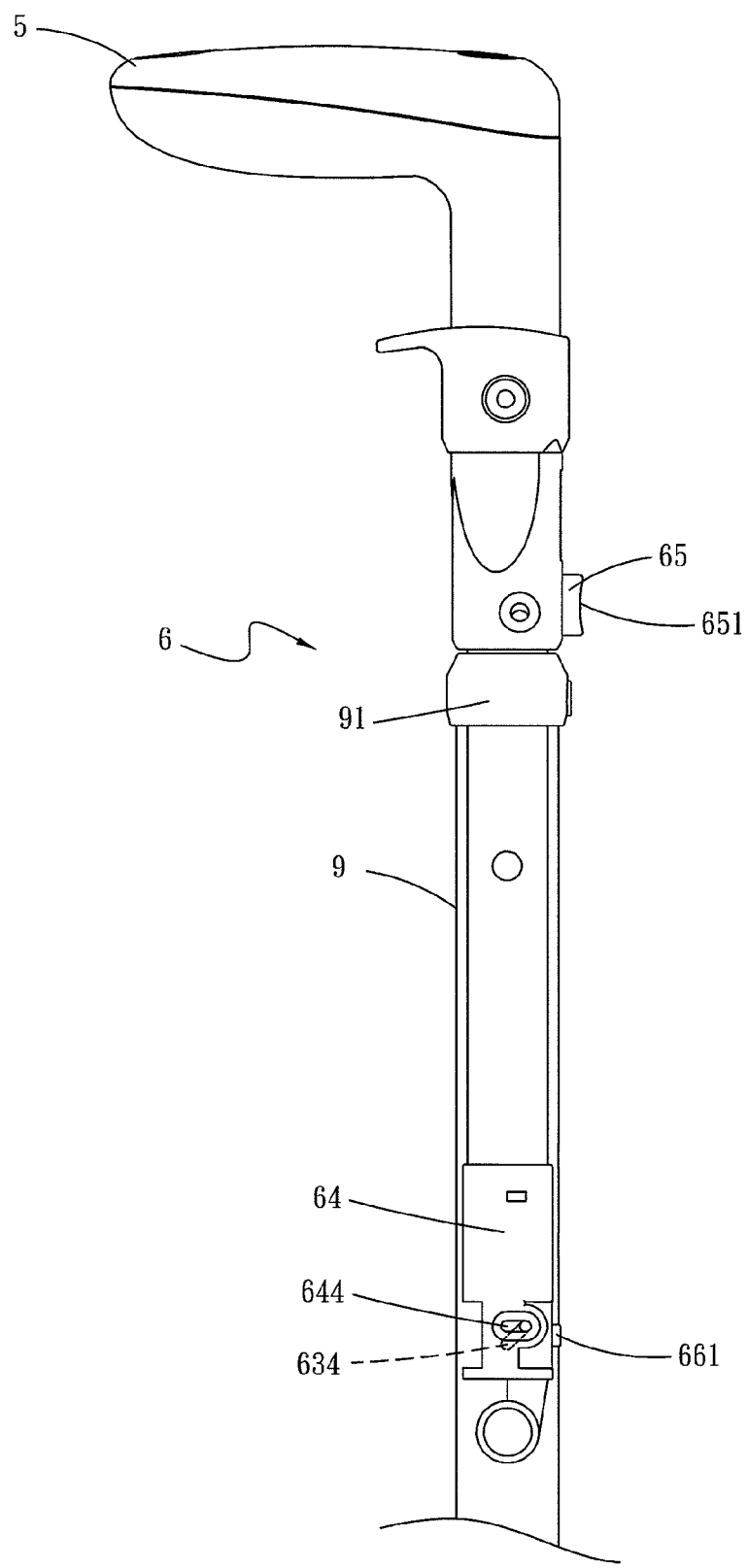
FIG. 8A is a schematic view of the elevation set in a latched condition.
Figure 8B:
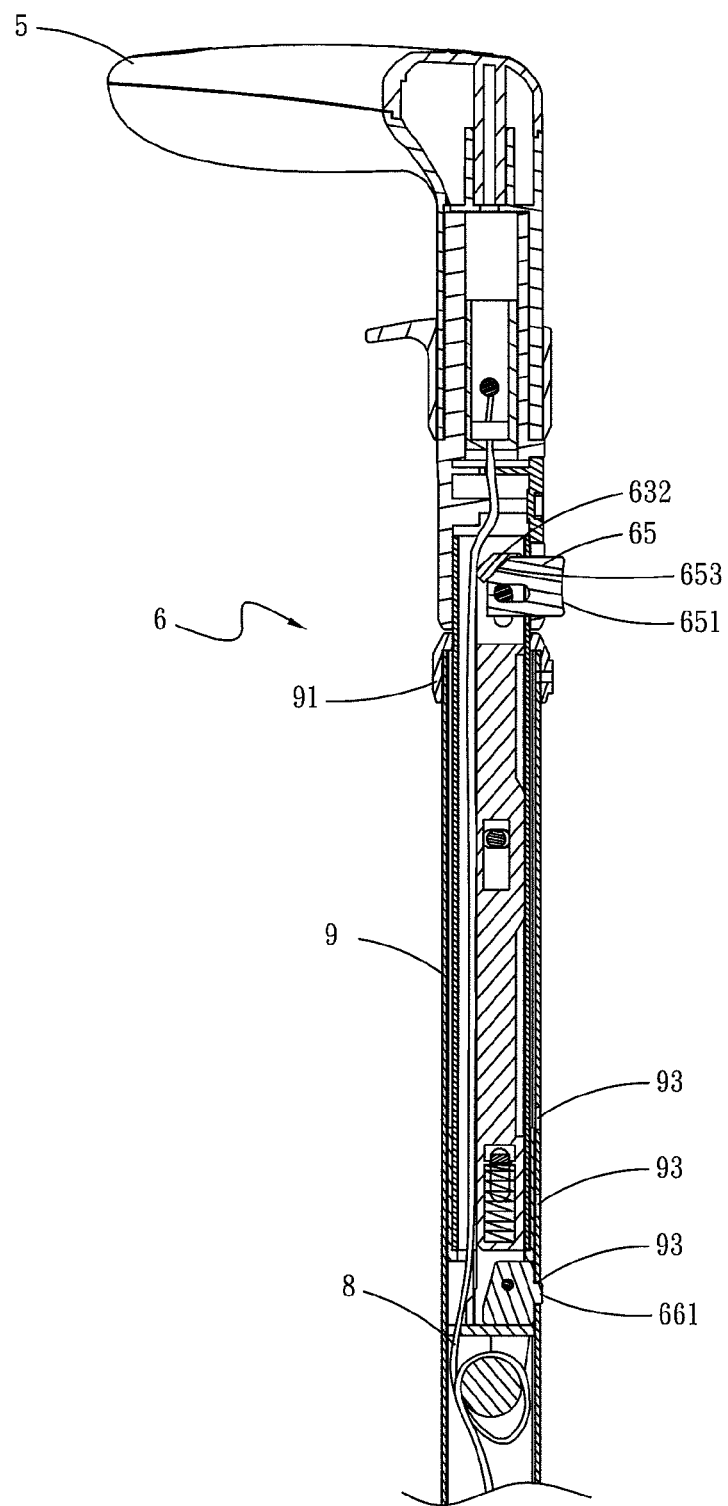
FIG. 8B is a sectional view according to FIG. 8A.
Figure 9A:
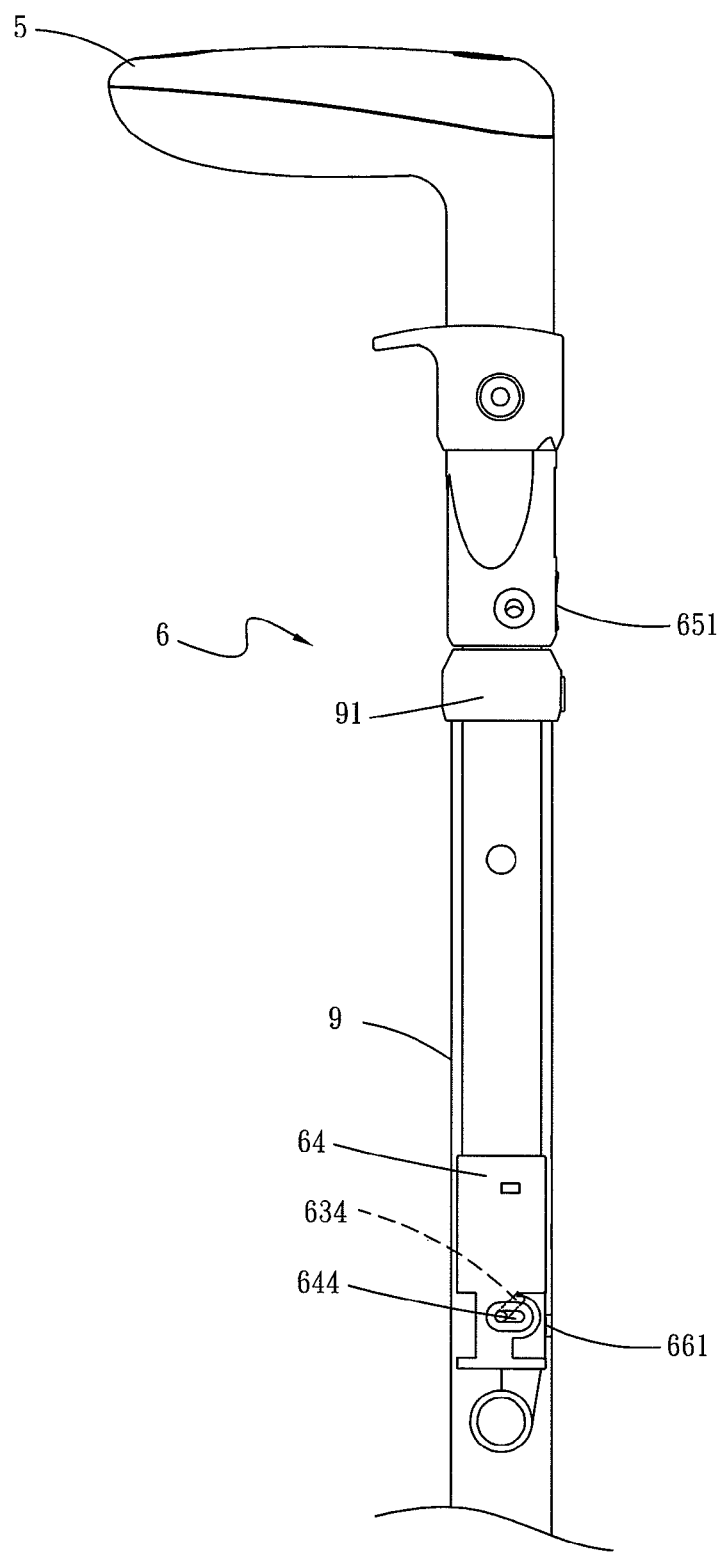
FIG. 9A is a schematic view of the elevation set in a released condition.
Figure 9B:
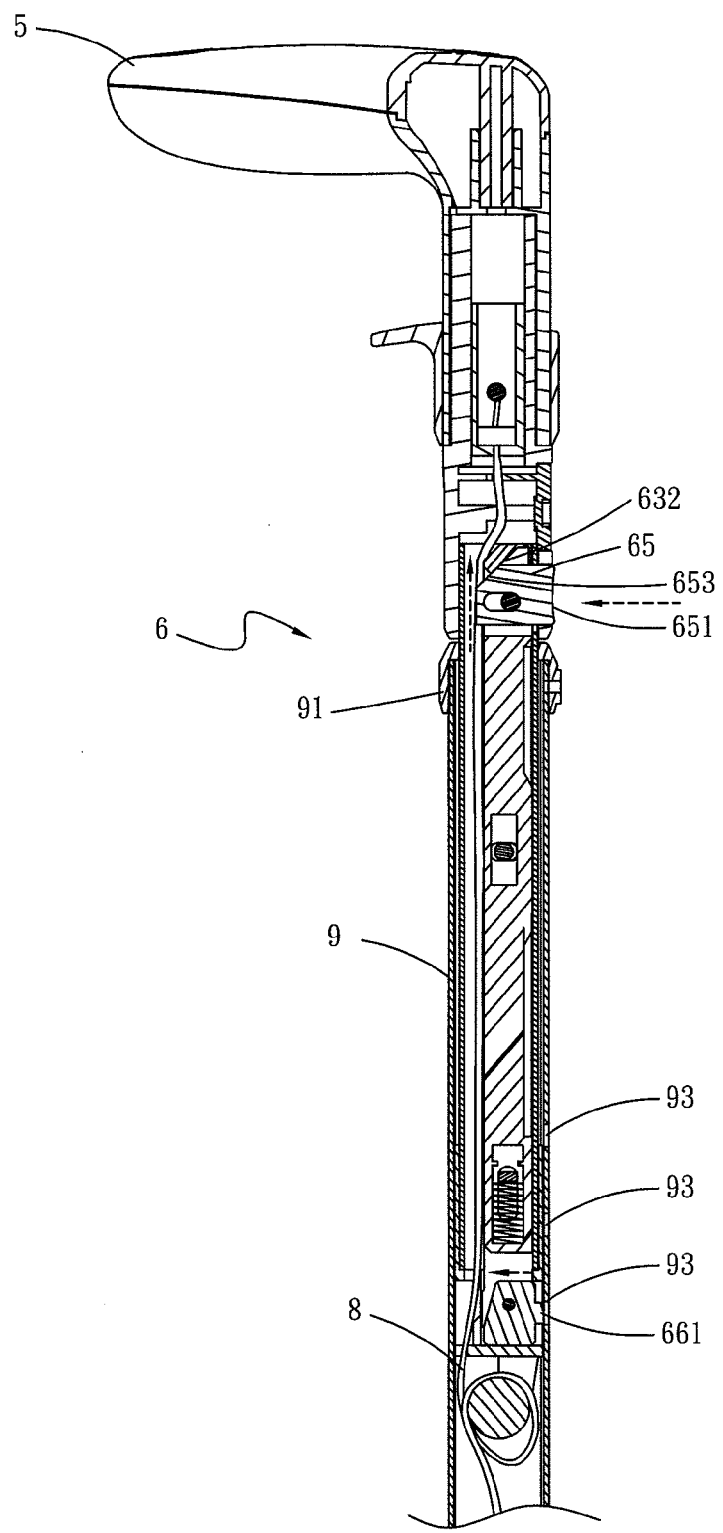
FIG. 9B is a sectional view according to FIG. 9A.
Figure 10A:
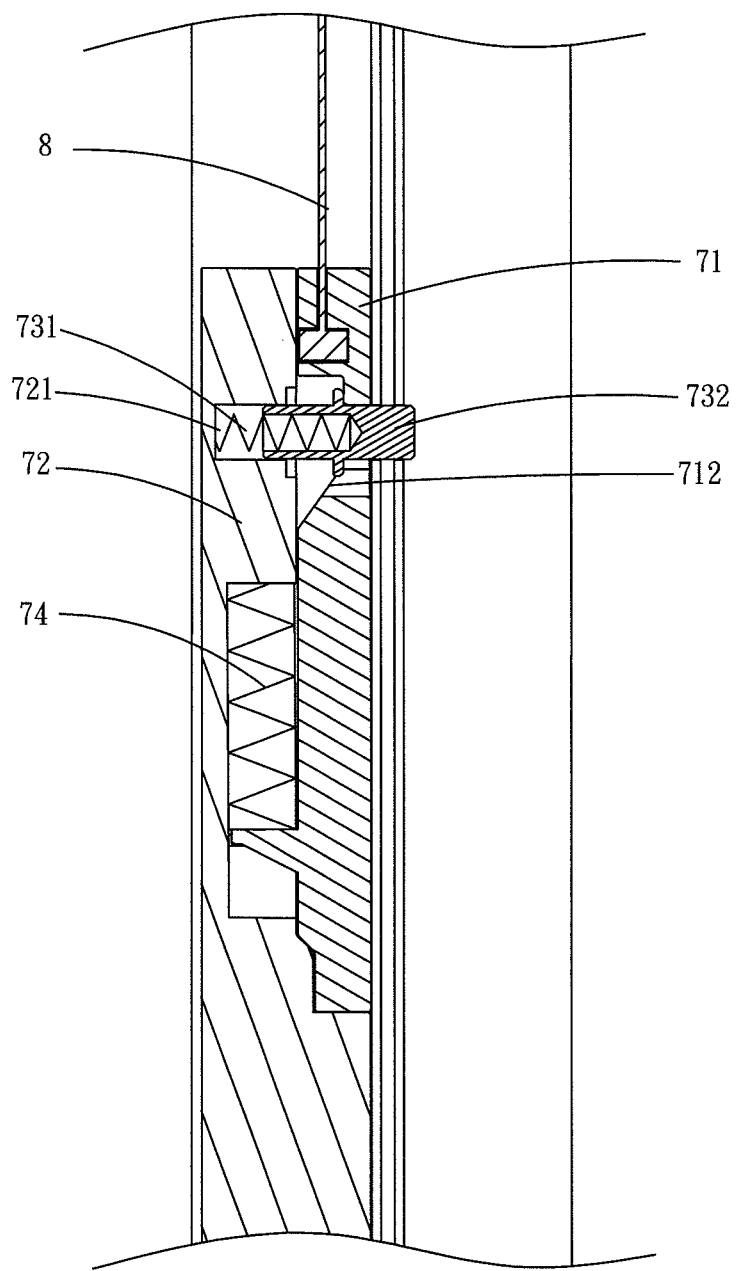
FIG. 10A is a sectional view of the folding set in a latched condition.
Figure 10B:
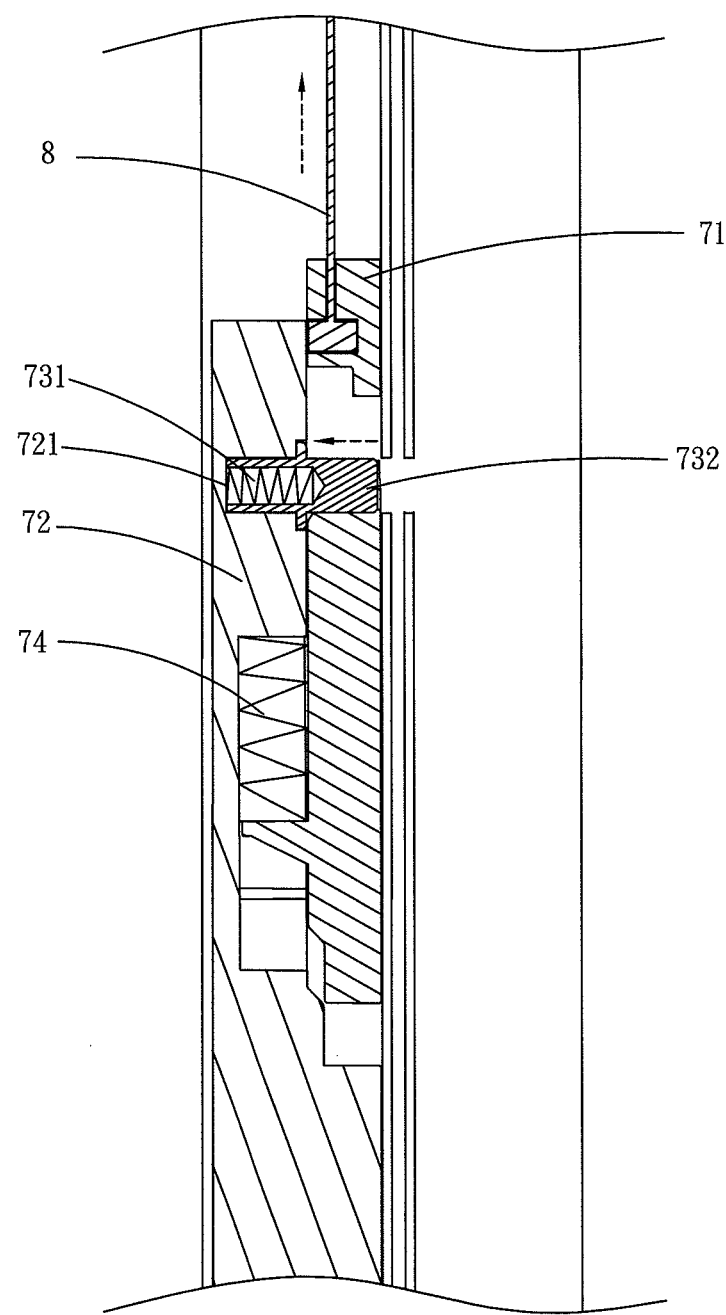
FIG. 10B is a sectional view of the folding set in a released condition.

Please refer to FIGS. 1 through 5B, the present invention provides a baby carriage that includes a frame 1 and a seat 2. The frame 1 includes a support rack 3 and a pair of handle sets 4.

The support rack 3 includes at least one holding member 31 with a front tube 32 fastened to a lower side and a rear tube 33 hinged on the lower side. The front tube 32 has an extension hole 321 near the middle portion and a retraction hole 322 close to a lower end which is coupled with a front wheel set 34. The rear tube 33 has a lower end coupled with a rear wheel set 35. The front wheel set 34 has a lateral wheel 341 at a front end axially perpendicular thereto.

Also referring to FIGS. 6 through 9B, each handle set 4 is fastened to the holding member 31 of the support rack 3, and includes a handgrip 5, an elevation set 6, a folding set 7, a flexible member 8 and an outer sleeve 9. The handgrip 5 has a coupling portion 51 with a coupling hole 511 and a first elongate slot 512 formed thereon. The coupling portion 51 is coupled with a driving member 52 on an outer side. The driving member 52 has a driving portion 521 protruded from one end thereof and pulled by a user, and a first through hole 522 on a lateral side corresponding to the first elongate slot 512.

The elevation set 6 includes a driven member 61, an adjustment member 62, a driven bar 63 and a coupling member 64. The driven member 61 has an upper latch slot 611 and a second through hole 612. The adjustment member 62 has an insertion portion 621 at one end. The insertion portion 621 has a passage 622 run through by the driven member 61 and a second elongate slot 623 on a lateral side corresponding to the first elongate slot 512. The insertion portion 621 is inserted into the coupling hole 511 of the coupling portion 51 and fastened to the first through hole 522 of the driving member 52 and the second through hole 612 of the driven member 61 via a fastening element (not shown in the drawings) such as a screw. Thereby when the driving portion 521 is pulled by a user, the driving member 52 and driven member 61 are moved within the first elongate slot 512. The adjustment member 62 has an insertion hole 624 at a lower end inserted by the coupling member 64 and an adjustment knob 65 at one side. The adjustment knob 65 has a pressing portion 651 protruded outwards and pressed by the user, a longitudinal hole 652, and an inclined surface 653 directing inwards at the upper end. The driven bar 63 has a transverse hole 631 and an inner inclined slot 632 at an upper end. The transverse hole 631 corresponds to the longitudinal hole 652 of the adjustment knob 65. The inner inclined slot 632 is butted by the inclined surface 653 of the adjustment knob 65. The driven bar 63 has a chamber 633 near the lower end and a diagonal slot 634 at the lower end. The chamber 633 holds an elastic element 635 such as a spring. The upper end of the coupling member 64 is inserted into the insertion hole 624 at the lower end of the adjustment member 62. The coupling member 64 has a hollow tube 641 run through by the driven bar 63. The hollow tube 641 has a latch hole 642 on one side corresponding to the chamber 633 and inserted by a latch member 643 which passes through the chamber 633 to retain the elastic element 635. The coupling member 64 further has a fastening hole 644 at the lower end corresponding to the diagonal slot 634 to hold a positioning plate 66 which has a lug 661 and an aperture 662. Through a retaining element (not shown in the drawings) running through the fastening hole 644, the diagonal slot 634 and the aperture 662, the positioning plate 66 can be slid and confined between the diagonal slot 634 and the fastening hole 644. The coupling member 64 further has a winding portion 645 at a distal end.

The folding set 7 includes a lower driving member 71, an upper driving member 72, an elastic pin 73 and an elastic member 74. The lower driving member 71 and the upper driving member 72 have respectively a first pin hole 711 and a second pin hole 721 that are corresponding to each other and inserted by the elastic pin 73. The first pin hole 711 is located within a notch 712 with a slanted surface. The lower driving member 71 has a lower latch slot 713 at the upper end. The elastic pin 73 is inserted into the first pin hole 711, and has a resilient element 731 such as a spring on the upper end, a pin 732 at the lower end, and a washer 733 near the middle portion of the pin 732 formed at a diameter greater than that of the pin 732. The upper driving member 72 and lower driving member 71 can slide against each other. The elastic member 74 is a spring interposed between the lower and upper driving members 71 and 72 to force the lower and upper driving members 71 and 72 to return to their corresponding positions.

The flexible member 8 is a rope set with one end fastened to the upper latch slot 611 of the driven member 61 and wound on the winding portion 645 of the coupling member 64 for one coil and another end fastened to the lower latch slot 713 of the lower driving member 71.

The outer sleeve 9 is coupled on the outer sides of the elevation set 6 and folding set 7 and coupled with a retaining bushing 91 at the upper end to butt against a lower edge of the adjustment member 62. The outer sleeve 9 has a lower retaining element 92 (referring to FIG. 5B) at the lower end to cover the lower end of the upper driving member 72 to keep a selected distance between the elevation set 6 and the folding set 7 so that elements thereof can be protected to increase their lifespan. The outer sleeve 9 further has a plurality of adjustment holes 93 on the lower wall (referring to FIG. 8B) latched by the lug 661 of the positioning plate 66.

Please refer to FIGS. 8A through 9B. When adjusting the height of the handle is desired, the user presses the pressing portion 651 of the adjustment knob 65 to move inwards, and then the inclined surface 653 is butted against the inner inclined slot 632 of the driven bar 63 so that the driven bar 63 is moved along the inclined direction towards the handgrip 5. Consequently, the positioning plate 66 originally retained at the diagonal slot 634 and the fastening hole 644 is moved inwards through the fastening hole 644 to release the latched condition of the lug 661 in the adjustment hole 93. Then the pressing portion 651 is continuously pressed and the handgrip 5 is also pulled to adjust the position of the coupling member 64 and latch the lug 661 in a selected adjustment hole 93 to adjust the elevation as desired. When moving the coupling member 64 is desired, the diameter of the coil of the flexible member 8 wound on the winding portion 645 can be enlarged or shrunk due to different positions of the coupling member 64. However, since the upper and lower ends of the inner rope of the flexible member 8 have respectively fastened to the driven member 61 and lower driving member 71, folding movements of the invention are not affected.

Please refer to FIGS. 3A, 5B, 10A and 10B. When the baby carriage of the invention is in an unfolding condition, the elastic pin 73 is inserted into the extension hole 321 of the front tube 32. When folding the baby carriage is desired, the user pulls the driving portion 521 to drive the inner rope of the flexible member 8, so that the lower driving member 71 fastened to the lower end of the flexible member 8 is drawn and moved upwards. Then the slanted surface of the notch 712 presses the pin 732 to retract inwards to release the latched condition with the support rack 3 so that the handle set 4 can slide downwards along the front tube 32. When the pin 732 is latched in the retraction hole 322 of the front tube 32, the two sides of the support rack 3 can be moved towards the middle through the lateral wheel 341 at the front end of the front wheel set 34 to shrink the baby carriage into a smaller size.

Figure 11:
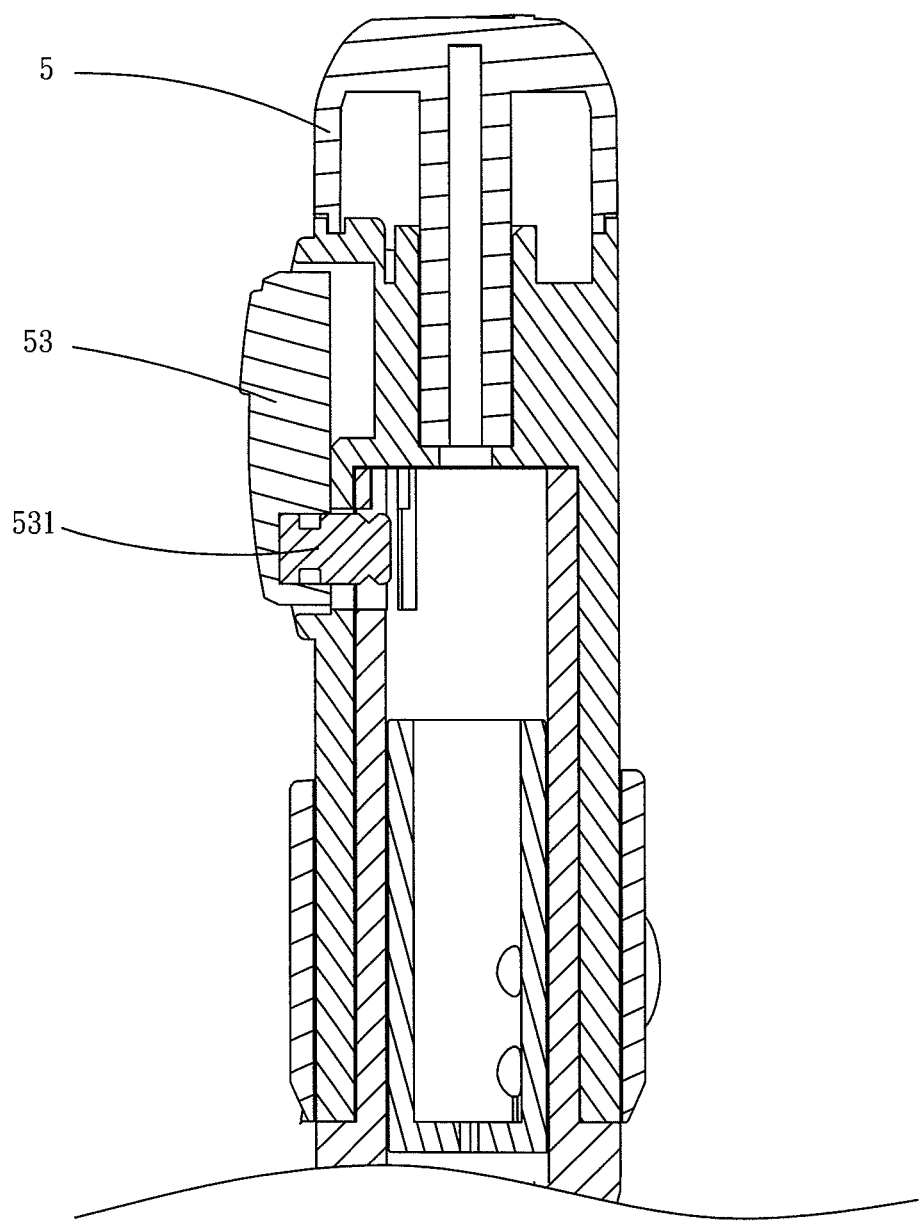
FIG. 11 is a sectional view of the handgrip of the invention.
Figure 12:
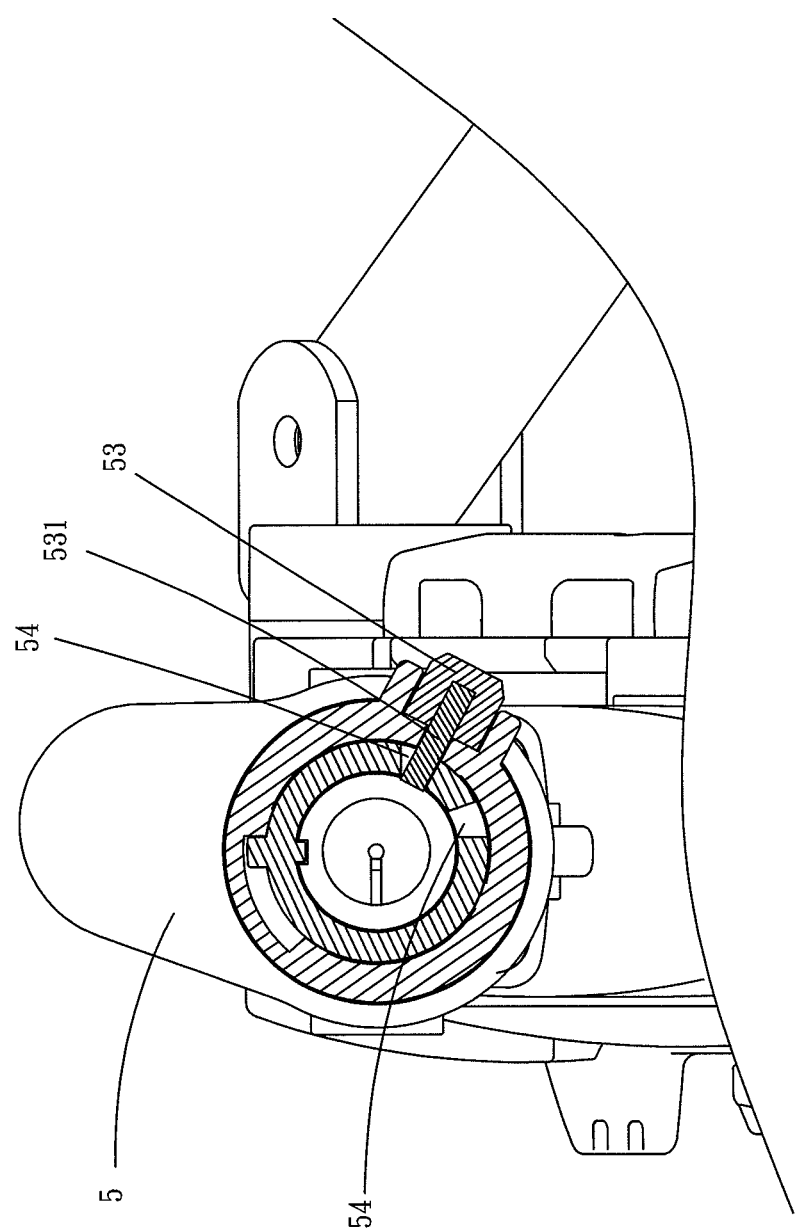
FIG. 12 is another sectional view of the handgrip of the invention.

Referring to FIGS. 11 and 12, the handgrip 5 can also include a turning control knob 53 at one side with a latch member 531 and a plurality of turning holes 54 formed inside latched by the latch member 531 to form positioning. The user can press the turning control knob 53 to release the latched condition between the latch member 531 and the turning hole 54, and then turn the handgrip 5 to mate another selected turning hole 54 and release the turning control knob 53 to return the handgrip 5 to the desired position for anchoring.

What is claimed is:

1. A baby carriage, comprising a frame and a seat mounted onto the frame, the frame including a support rack and a pair of handle sets, wherein:

the support rack includes at least one holding member, a front tube fastened to a lower side of the holding member and a rear tube hinged on the lower side of the holding member, the front tube including an extension hole near the middle portion thereof and a retraction hole close to a front lower end thereof coupled with a front wheel set; the rear tube including a rear lower end coupled with a rear wheel set; the front wheel set further including a lateral wheel at a front end thereof;

the handle set is fastened to the holding member of the support rack and includes a handgrip, an elevation set, a folding set, a flexible member and an outer sleeve; the handgrip including a coupling portion which is coupled with a driving member on an outer side; the elevation set including a driven member, an adjustment member, a driven bar and a coupling member; the driven member including an upper latch slot; the adjustment member including an insertion portion at one end thereof that includes a passage run through by the driven member and is inserted into the coupling portion, and also including an insertion hole at a lower end thereof and an adjustment knob at one side that includes a pressing portion and a longitudinal hole; the driven bar including a transverse hole at an upper end corresponding to the longitudinal hole of the adjustment knob, a chamber close to a lower end to hold an elastic element, and a diagonal slot at the lower end thereof; the coupling member including an upper end inserted into the insertion hole of the adjustment member, a hollow tube run through by the driven bar, a fastening hole at a lower end thereof corresponding to the diagonal slot to hold a positioning plate which includes a lug, and a winding portion at a distal end thereof; the folding set including a lower driving member, an upper driving member, an elastic pin and an elastic member; the lower driving member and the upper driving member being slid relative to each other and including respectively a first pin hole and a second pin hole corresponding to each other and inserted by the elastic pin; the first pin hole being located within a notch with a slanted surface; the lower driving member including a lower latch slot at an upper end thereof; the elastic member being interposed between the lower driving member and the upper driving member; the flexible member including one end fastened to the upper latch slot of the driven member and wound on the winding portion of the coupling member for one coil and another end fastened to the lower latch slot of the lower driving member; the outer sleeve being coupled on the outer sides of the elevation set and the folding set and including a plurality of adjustment holes formed on a lower wall thereof.

2. The baby carriage of claim 1, wherein the driving member includes a driving portion protruded from one end thereof.

3. The baby carriage of claim 1, wherein the outer sleeve further is coupled with a retaining bushing at an upper end which butts against a lower edge of the adjustment member.

4. The baby carriage of claim 1, wherein the outer sleeve further includes a lower retaining element at a lower end thereof.

5. The baby carriage of claim 1, wherein the elastic pin includes a resilient element at an upper end, a pin at a lower end, and a washer close to a middle portion of the pin and formed at a diameter greater than that of the pin.

6. The baby carriage of claim 1, wherein the handgrip includes a turning control knob at one side with a latch member and a plurality of turning holes inside latched by the latch member to form positioning.

7. The baby carriage of claim 1, wherein the coupling portion includes a first elongate slot.

8. The baby carriage of claim 7, wherein the insertion portion includes a second elongate slot corresponding to the first elongate slot.

9. The baby carriage of claim 1, wherein the adjustment knob includes an inclined surface directing inwards at an upper end thereof.

10. The baby carriage of claim 9, wherein the driven bar includes an inner inclined slot at the upper end thereof.

11. The baby carriage of claim 1, wherein the hollow tube includes a latch hole on one side corresponding to the chamber and inserted by a latch member which passes through the chamber.

* * * * *